US008190146B2

(12) United States Patent  
Beckmann et al.

(10) Patent No.: US 8,190,146 B2  
(45) Date of Patent: May 29, 2012

(54) METHOD AND DATA SYSTEM FOR CONNECTING A WIRELESS LOCAL NETWORK TO A UMTS TERMINAL

(75) Inventors: Mark Beckmann, Braunschweig (DE); Hyung-Nam Choi, Hamburg (DE); Sabine Van Niekerk, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 708 days.

(21) Appl. No.: 10/522,345

(22) PCT Filed: Jun. 11, 2003

(86) PCT No.: PCT/DE03/01944  
§ 371 (c)(1),  
(2), (4) Date: Mar. 10, 2005

(87) PCT Pub. No.: WO2004/017566  
PCT Pub. Date: Feb. 26, 2004

(65) Prior Publication Data  
US 2005/0235149 A1 Oct. 20, 2005

(30) Foreign Application Priority Data  
Jul. 24, 2002 (DE) .................................. 102 33 606

(51) Int. Cl.  
*H04W 4/00* (2009.01)

(52) U.S. Cl. ..................... 455/426.2; 455/407; 455/425; 455/558; 455/466; 455/464; 455/552.1; 455/437; 370/331; 370/351; 380/247; 380/248; 380/249; 380/250; 713/167; 713/168; 713/185; 713/186; 726/23; 726/24; 726/25; 709/224; 709/225; 709/226

(58) Field of Classification Search ............... 455/426.2, 455/407, 425, 558, 466, 464, 432.1, 437, 455/552.1, 432; 713/168, 167, 185, 186; 370/331, 351; 380/247, 248, 249, 250; 726/23, 726/24, 25; 709/224, 225, 226  
See application file for complete search history.

(56) References Cited

U.S. PATENT DOCUMENTS

| 6,078,811 A * | 6/2000 | Lin et al. ..................... 455/433 |
| 6,549,779 B1 * | 4/2003 | Muller et al. ................ 455/439 |

(Continued)

FOREIGN PATENT DOCUMENTS

| EP | 1 241 841 | 9/2002 |
| WO | WO 00/51375 | 8/2000 |
| WO | WO 01/58190 | 8/2001 |
| WO | WO 02/09458 | 1/2002 |
| WO | WO 03/037023 | 5/2003 |

OTHER PUBLICATIONS

3GPP Technical Specification ETSI Ts 131 111 V4.5.0 (Dec. 2001).*

(Continued)

*Primary Examiner* — Nimesh Patel  
(74) *Attorney, Agent, or Firm* — King & Spalding L.L.P.

(57) ABSTRACT

A method is provided for connecting a wireless local network (WLAN) to a UMTS terminal station (ME) having USIM/USAT functionality, including the following method steps: monitoring the activity of the local network via the terminal station; transmitting the type and/or identity number of the local network to the terminal station once the activity of the local network has been successfully detected; initiating a logical link between the local network and the terminal station, and; querying the specific subscriber data of the local network. In an embodiment of the present invention, the temporary status of the local network and/or specific subscriber data of the local network are/is queried at periodic intervals.

15 Claims, 4 Drawing Sheets

U.S. PATENT DOCUMENTS

| | | | |
|---|---|---|---|
| 6,556,820 B1* | 4/2003 | Le et al. | 455/411 |
| 6,708,033 B1* | 3/2004 | Linkola et al. | 455/440 |
| 6,721,886 B1* | 4/2004 | Uskela | 713/168 |
| 7,181,218 B2* | 2/2007 | Ovesjo et al. | 455/436 |
| 2002/0086670 A1* | 7/2002 | Rajaniemi et al. | 455/426 |
| 2003/0073440 A1* | 4/2003 | Mukherjee et al. | 455/435 |
| 2004/0043791 A1* | 3/2004 | Reddy | 455/558 |

OTHER PUBLICATIONS

XP 002258929—ETSI: "Digital cellular telecommunications system (Phase 2+) (GSM): Universal Mobile Telecommunications System (UMTS): USIM Application Toolkit (USAT) (3GPP TS 31.111 version 4.5.0 Release 4)", Dec. 2001, pp. 1-158.

IEEE Standard 802.11—1997, Information Technology—Telecommunicastions and Information Exchange between Systems—Local and Metropolitan Area Networks—Specific requirements—Part 11: Wireless LAN Medium Access Contol (MAC) and Physical Layer (PHY) Specifications; 466 pages, Jun. 26, 1997.

3G TS 31.111 v4.6.0 (2002-2003)—TTA English Standard, IMT2000 EGPP—USIM (USAT) (USIM Application Toolkit—USAT); 149 pages, May 29, 2002.

Korean Office Action, Korean patent application serial No. 10-2005-7001227, 14 pages, Jan. 27, 2010.

* cited by examiner

METHOD AND DATA SYSTEM FOR CONNECTING A WIRELESS LOCAL NETWORK TO A UMTS TERMINAL

BACKGROUND OF THE INVENTION

Wireless networks, known as WLANs (Wireless Local Area Networks), are increasingly being installed in small, local areas known as "hot spots" such as, for example, airports, hotels or similar areas with a high subscriber density. Because of the technical possibilities afforded by WLAN it is desirable to use this technology as an add-on to mobile radio systems of the third generation such as, for example, UMTS (Universal Mobile Telecommunications System).

FIG. 1 shows the basic principle of a WLAN network architecture in a schematic representation. It depicts a wireless local communication network in which mobile stations MTs (Mobile Terminals) are connected by radio via a number of access nodes APs (Access Points) to a broadband data network (BDN). The access nodes APs are WLAN base stations. Each access node AP supplies all the mobile terminals MTs contained in a cell. In this case, the cell size may extend to a maximum of several hundred meters. In principle, WLANs can be used to build a cellular radio network in which an existing data connection can be handed on from access node to access node in line with the movement of the mobile terminals MT. In mobile radio contexts this is generally known as "roaming". The maximum data rates are dependent on the respective WLAN technology and can range up to 54 Mbit/s.

To connect a WLAN in UMTS, an architecture is known in which WLAN and UMTS represent autonomous systems that are connected to each other via an interworking unit (IWU). FIG. 2 shows this known network architecture in a schematic representation. The purpose of the element IWU is to convert signaling and user data from WLAN to UMTS and vice versa. The WLAN is represented with the elements AP, router and AAAL. The APs are, in turn, access nodes, the router is a switching processor and the AAAL (Authentication Authorization Accounting Local) is a local computer which is used for authentication, authorization and accounting. The network architecture of UMTS is shown with the elements NodeB, RNC, SGSN, GGSN and HSS. NodeB is a UMTS base station, the RNC (Radio Network Controller) is a radio network control element, SGSN (Serving GPRS Support Node) and GGSN (Gateway GPRS Support Node) are GPRS support nodes and the HSS (Home Subscriber Server) is a local subscriber computer. GPRS (General Packet Radio Service) is a mobile radio standard according to which a dedicated data connection is not set up for each subscriber, but instead the total number of available transmission resources is allocated as needed to the individual subscribers, and the data is transmitted in packets.

In the UMTS, the actual terminal station, designated in the diagram as user facility UE (User Equipment), consists of the mobile facility ME (Mobile Equipment) and the physical chip card UICC (Universal Integrated Circuit Card). FIG. 3 shows the corresponding layout of user equipment UE in schematic form. The USIM (Universal Subscriber Identity Module) together with the USAT functionality (USIM Application Toolkit) is implemented as standard on the UICC. The USIM corresponds to the SIM (Subscriber Identity Module) in the second-generation mobile radio standard GSM (Global System for Mobile Communications). The USIM enables a mobile radio subscriber to use his or her ME in a UMTS radio network. All the important data of the subscriber access is stored on the USIM, such data serving to identify and to prove the access authorization, that is to say authentication, of the mobile radio subscriber, as well as to ensure encryption and decryption of the user data as protection against eavesdropping and tampering or corruption. The USAT functionality enables the ME to be configured directly via the UMTS radio network. Technical specification TS 31. 111 Version 4. 5. 0 (2001-12) "USIM Application Toolkit (USAT)" of the 3rd Generation Partnership Project (3GPP) deals with the interface between the ME and the UICC and essentially includes a list of commands which the ME can convert interactively with the UICC.

With the desired connection of WLAN in UMTS there is, however, the problem that frequent connection setups and/or cleardowns are necessary due to the non-permanent availability of the WLAN. Known procedures are handicapped by high signaling overhead or often cannot guarantee reliable connection setup and/or cleardown. Furthermore, because of the USIM/USAT standardization in UMTS, an existing data connection in the WLAN should be monitored by the USIM/USAT of the UMTS terminal station. However, an implementation of a corresponding process of control is not known to date.

The present invention is, therefore, directed toward a method and a data system for connecting a wireless local network to a UMTS terminal station with USIM/USAT functionality which enables an exchange of WLAN-specific data between a UMTS terminal station and UICC and, in addition, guarantees reliable connection setup and/or cleardown.

SUMMARY OF THE INVENTION

Accordingly, the inventive method for connecting a wireless local network to a UMTS terminal station with USIM/USAT functionality includes the following method steps:
monitoring of the activity of the local network by the terminal station;
transmission of the type and/or the identity number of the local network to the terminal station following successful detection of local network activity;
initiation of a logical connection between the local network and the terminal station; and
polling of the specific subscriber data of the local network.

The wireless local network is preferably implemented using WLAN technologies which support broadband radio access to broadband data networks. Furthermore, the wireless local network is preferably based on the TCP/IP (Transmission Control Protocol/Internet Protocol), ATM (Asynchronous Transfer Mode), or B-ISDN (Broadband Integrated Services Digital network) standard. Examples of broadband WLAN technologies are IEEE 802.11, Hiperlan/2, Openair or SWAP. In the present context, WLAN is used as a synonym for all broadband WLAN technologies.

In an embodiment of the present invention the temporary status of the local network and/or specific subscriber data of the local network is polled at periodic intervals. Corresponding polling cycles are preferably performed during an existing WLAN connection.

In a preferred embodiment, the specific subscriber data includes the data: type/identity number, subscriber identification, password, secret key for encrypting and decrypting data, and address of an access node. Furthermore, it is possible that the WLAN-specific data of the subscriber access which is used for identification and authentication of the mobile radio subscriber, as well as the encryption and decryption of the user data to protect against eavesdropping and tampering or corruption, is stored on the physical chip card UICC of the UMTS terminal station. For example, in order to monitor the connection setup and/or cleardown of an existing data connection in the WLAN the WLAN-specific data of the subscriber access can be requested and stored in the UMTS terminal station by the UICC.

In another embodiment, of the present invention, the monitoring of the activity of the local network and the transmission of the data to the terminal station is initiated by a universal chip card which is installed in the terminal device. Preferably, the universal chip card is the UICC. Furthermore the universal chip card preferably notifies the terminal station of a deactivation of the local network.

In a further embodiment of the present invention, the universal chip card initiates a cleardown of the logical connection between the local network and the terminal station. Furthermore, the terminal station preferably acknowledges all the data transmitted. An acknowledgment of this kind additionally may be used to transmit further information.

The present invention also provides a data system for connecting a wireless local network to a UMTS terminal station, the data system including:
  a local network;
  a UMTS terminal station with USIM/USAT functionality which is suitable for establishing a connection to the local network;
  parts for monitoring the activity of the local network, the parts for monitoring being contained in the terminal station;
  parts for transmitting the type and/or the identity number of the local network to the terminal station, with the transmission taking place following successful detection of local network activity;
  parts for initiating a logical connection between the local network and the terminal station; and
  parts for polling the specific subscriber data of the local network.

The present invention further provides a terminal station, particularly a mobile radio terminal device, for use in a method according to the present invention and/or for use in a data system according to the present invention.

Additional features and advantages of the present invention are described in, and will be apparent from, the following Detailed Description of the Invention and the Figures.

DETAILED DESCRIPTION OF THE INVENTION

Figure 1:
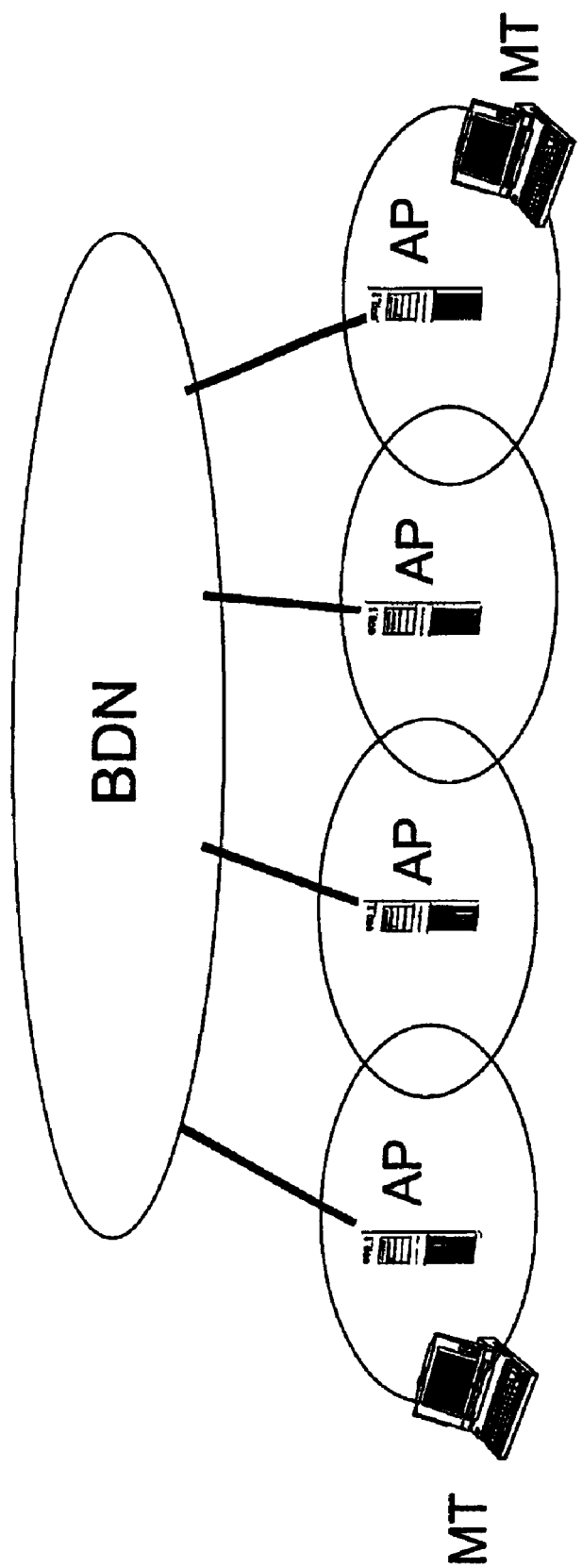
FIG. 1 shows a schematic representation of a WLAN network architecture.
Figure 2:
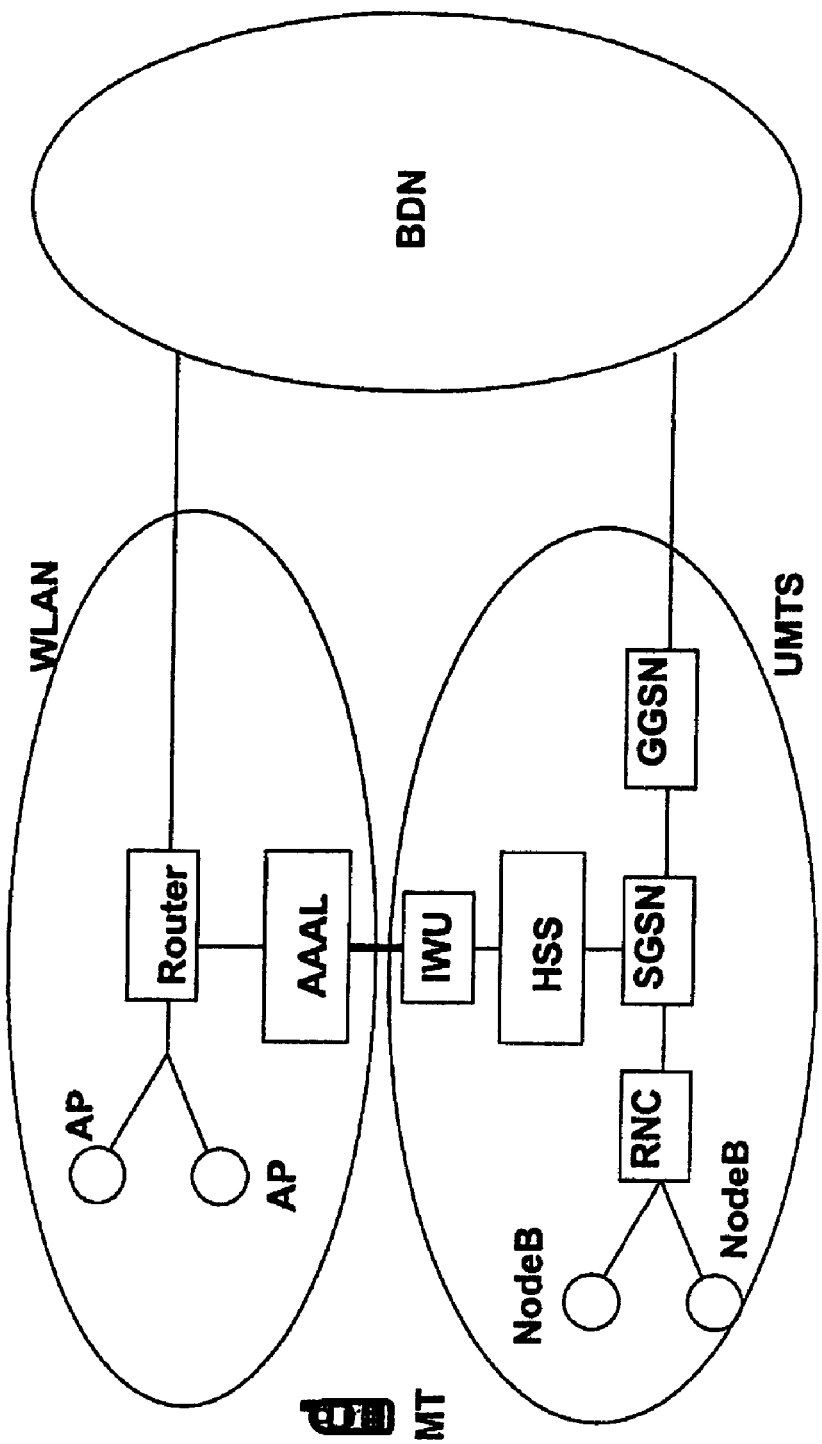
FIG. 2 shows a schematic representation of a UMTS/WLAN network architecture.
Figure 3:
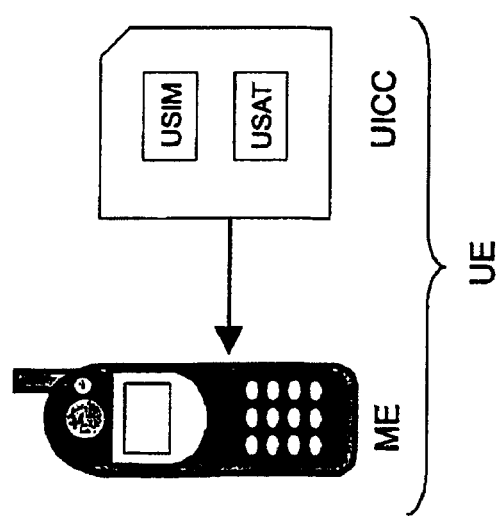
FIG. 3 shows a schematic representation of a mobile radio terminal device with a UICC card.

FIGS. 1 to 3 have already been explained in the Background section of the present application, so reference will be made to the corresponding embodiments.

Figure 4:
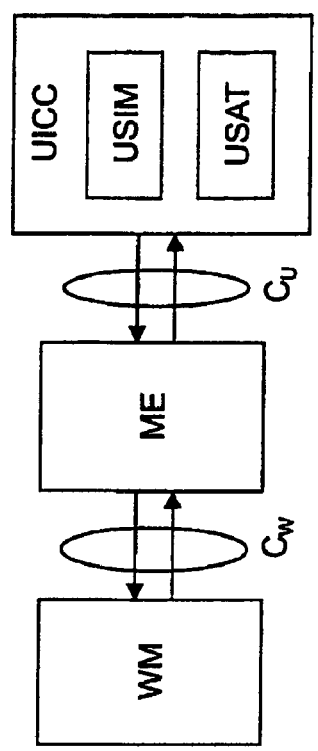
FIG. 4 shows a schematic representation of a UMTS user unit.

FIG. 4 shows a schematic representation of a UMTS user unit. The physical chip card UICC (Universal Integrated Circuit Card) includes USIM and USAT. The UICC is connected to the mobile equipment ME via a communication interface Cu. The mobile equipment ME is connected, in turn, to a WLAN module WM via the communication interface Cw. In the UMTS unit, the hardware-side WLAN connection can be implemented by a corresponding module in a form whereby the module is either already integrated therein as a WLAN radio part or can be inserted as a WLAN PC card into the corresponding interface of the station; for example, in the form of a PCMCIA (Personal Computer Memory Card International Association) interface.

Figure 5:
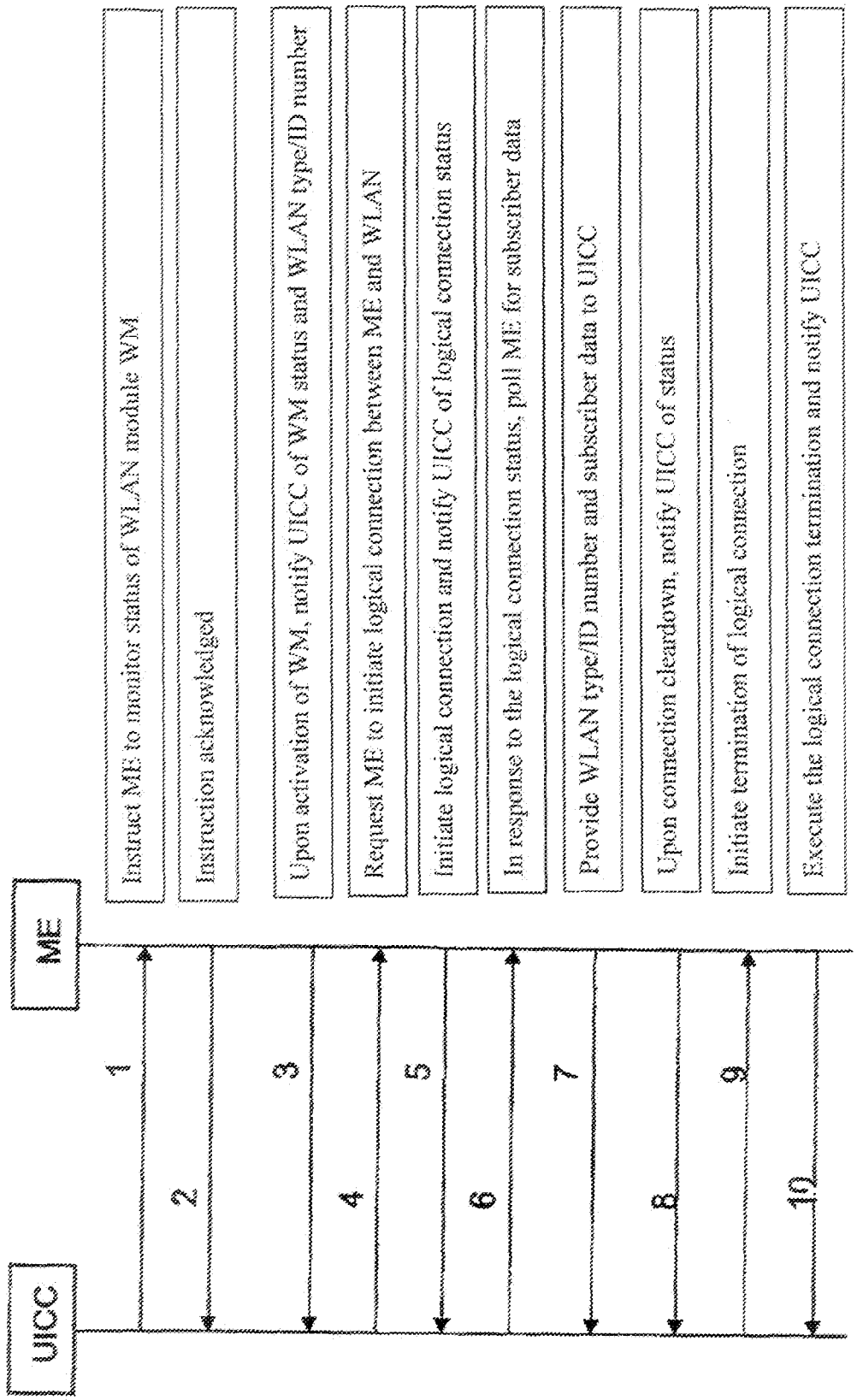
FIG. 5 shows an exemplary embodiment of an information flow between UICC and ME.

FIG. 5 shows an exemplary embodiment of an information flow between a physical chip card UICC and a mobile equipment ME. It is assumed in this case that a mobile radio subscriber is at a location at which he or she has access to a UMTS and a WLAN radio network. His or her mobile radio terminal device consists of the components UICC, ME and WM (compare FIGS. 3 and 4). It is further assumed that a network architecture is present wherein WLAN and UMTS are connected as shown in FIG. 2. It is also assumed that the subscriber is registered in the UMTS network with his or her UMTS terminal station and wants to set up an Internet connection via a WLAN based on the IEEE 802. 11 technology. Toward that end, the subscriber must first identify and authenticate himself/herself to the WLAN network. He/she does this by keying his/her name for the purpose of subscriber identification and his/her password for the purpose of authentication into a corresponding input menu of his/her terminal station. This is registered by the WLAN module WM and, if the details are input correctly, the subscriber now may set up an Internet connection by WLAN.

In order to monitor the connection setup and cleardown as well as an existing data connection in the WLAN, the WLAN-specific subscriber data is requested and stored by the UICC. FIG. 5 shows an exemplary embodiment of the corresponding information flow between UICC and ME. It is assumed here that the interface Cw according to FIG. 4 is implemented in such a way that it supports the information flow across the interface Cu in a suitable manner.

In step 1 shown in FIG. 5, UICC directs the ME to monitor the "Active" status of the WLAN module WM. As a response 2 thereto, the ME sends a positive reception acknowledgement. Following occurrence of the event, that is to say the activation of the WLAN module WM as a result of a connection setup, the ME sends a response 3 containing the set parameters "Status=Active," "WLAN type/identity number=IEEE 802. 11" to the UICC. Before the actual polling of the WLAN-specific subscriber data can take place, a logical connection is initiated. This is implemented by the UICC with the request 4 and the set parameter "WLAN type/identity number=IEEE 802. 11" to the ME. As the response 5 the ME notifies the UICC via the set parameters "Status=OK" and "WLAN type/identity number=IEEE 802. 11," as an acknowledgement, that the request has been executed. Pursuant to the request 6, the UICC then interrogates the ME for the subscriber data of the WLAN module. The ME's response 7 contains the corresponding information: WLAN type/identity number, subscriber identification, password, secret key for data encryption and decryption, and Internet protocol address of the access node AP. In the case of the connection cleardown, that is to say the deactivation of the WLAN module, the ME sends a response 8 containing the set parameters "Status=Not Active," WLAN type/identity number=IEEE 802.11" to the UICC. To terminate the logical connection, the UICC sends the command 9 containing the set parameter "WLAN type/identity number=IEEE 802.11" to the ME. Finally, with the response 10 and the status field "OK," the ME notifies the UICC that the request has been executed and the logical connection terminated.

During an existing WLAN connection, that is to say between the steps 7 and 8, it is also possible that the UICC polls the temporary status of the WLAN module or, as the case may be, the WLAN-specific subscriber data at periodic intervals.

In the exemplary embodiment, it was assumed that the interface Cw is already implemented in such a way that it can support the data exchange via the interface Cu (compare FIG. 4). Six USAT commands are defined for the purpose of implementing the data exchange between UICC and ME via the interface Cu:

1) Request the WLAN status: Pursuant to this command, the UICC can interrogate the ME for the status, such as "Active" or "Not Active" and type or identity number of the WLAN module, such asIEEE 802.11 or Hiperlan/2. As aresponse thereto, the ME is expected to send the corresponding information to the UICC via the command "terminal response." This command has the parameters status and WLAN type/identity number.

2) Request WLAN information: Pursuant to this command, the UICC can interrogate the ME for the WLAN-specific subscriber data of the WLAN module. As aresponse thereto, the ME is expected to send the corresponding information to the UICC via the command "terminal response." This command includes the parameters WLAN type/identity number, subscriber identification, password, secret key for data encryption and decryption, and Internet protocol address of the access node AP. This command corresponds to step 6 in FIG. 5.

3) Connect WLAN: Pursuant to this command, the UICC can instruct the ME to initiate a logical connection to the WLAN module. As a response thereto, the ME is expected to notify the UICC via the command "terminal response" whether the request could be executed or not. This command has the parameter WLAN type/identity number and corresponds to step 4 in FIG. 5.

4) Disconnect WLAN: Pursuant to this command, the UICC instructs the ME to terminate a logical connection with the WLAN module. As a response thereto the ME is expected to notify the UICC via the command "terminal response" whether the request could be executed or not. This command has the parameter WLAN type/identity number and corresponds to step 9 in FIG. 5.

5) Set up an event list: Pursuant to this command, the UICC instructs the ME to monitor the status of the WLAN module; for example, "Active." As a direct response thereto, the ME is expected to send a "terminal response" containing "Accepted" or "Not accepted" to the UICC as an acknowledgement of the command. If the event occurs, that is to say in the case of the activation of the WLAN module, the ME is expected to send the corresponding information to the UICC via the command "terminal response." With this command, the WLAN-specific status parameters are added to the already existing parameter list; that is to say, event list. This command corresponds to step 1 in FIG. 5.

6) Terminal response: This is a command by which the ME is expected to respond accordingly to the requests of the UICC concerning the above defined WLAN-specific commands. In the process, the WLAN-specific parameters (i.e., status, WLAN type/identity number, subscriber identification, password, secret key for data encryption and decryption, and Internet protocol address of the access node AP) are added to the already existing parameter list. This command corresponds to steps 2, 3, 5, 7, 8 and 10 in FIG. 5.

The following table shows in summary form the list of new commands together with parameter, source and destination:

| Command | Parameter | Source | Destination |
|---------|-----------|--------|-------------|
| Request WLAN status | Status<br>WLAN type/identity number | UICC | ME |
| Request WLAN information | WLAN type/identity number<br>Subscriber identification<br>Password<br>Secret data encryption and decryption key<br>IP address of the AP | UICC | ME |
| Connect WLAN | WLAN type/identity number | UICC | ME |
| Disconnect WLAN | WLAN type/identity number | UICC | ME |
| Set up an event list | Status | UICC | ME |
| Terminal response | Status<br>WLAN type/identity number<br>Subscriber identification<br>Password<br>Secret data encryption and decryption key<br>IP address of the AP | ME | UICC |

Although the present invention has been described with reference to specific embodiments, those of skill in the art will recognize that changes may be made thereto without departing from the spirit and scope of the present application as set forth in the hereafter appended claims.

The invention claimed is:

1. A method for connecting a wireless local network to a UMTS terminal station having USIM/USAT functionality, the method comprising:
   monitoring activity of the wireless local network by the terminal station, the activity based on establishing a connection between the terminal station and the wireless local network;
   transmitting at least one of a type and an identity number of the wireless local network to the terminal station following successful detection of local network activity indicating an established connection between the terminal station and the wireless local network;
   the terminal station receiving a request to initiate a logical connection between the wireless local network and the terminal station;
   in response to the request, the terminal station initiating the logical connection between the wireless local network and the terminal station;
   the terminal station communicating a status notification to a universal chip card installed in the terminal station, the status notification indicating that the logical connection between the wireless local network and the terminal station has been initiated;
   in response to receiving the status notification from the terminal station indicating that the logical connection between the wireless local network and the terminal station has been initiated, the universal chip card polling the terminal station for specific subscriber data of the wireless local network for the logical connection.

2. A method for connecting a wireless local network to a UMTS terminal station as claimed in claim 1, wherein a temporary status of at least one of the wireless local network and the specific subscriber data of the wireless local network is polled at periodic intervals.

3. A method for connecting a wireless local network to a UMTS terminal station as claimed in claim 1, wherein the specific subscriber data of the wireless local network includes a type/identity number, a subscriber identification, a password, a secret key for data encryption and decryption, and an address of an access node.

4. A method for connecting a Wireless local network to a UMTS terminal station as claimed in claim 1, wherein the steps of monitoring and transmitting are initiated by the universal chip card installed in the terminal station.

5. A method for connecting a wireless local network to a UMTS terminal station as claimed in claim 4, wherein the terminal station notifies the universal chip card of a deactivation of the wireless local network.

6. A method for connecting a wireless local network to a UMTS terminal station as claimed in claim 5, wherein the universal chip card initiates a cleardown of the logical connection between the wireless local network and the terminal station.

7. A method for connecting a wireless local network to a UMTS terminal station as claimed in claim 1, wherein the terminal station acknowledges all data transmitted.

8. A data system for connecting a wireless local network to a UMTS terminal station, comprising:
  a wireless local network;
  a UMTS terminal station having USIM/USAT functionality establishing, a connection to the wireless local network;
  the UMTS terminal station including:
    parts for monitoring activity of the wireless local network, the activity based on establishing a connection between the terminal station and the wireless local network, wherein the parts for monitoring are contained in the terminal station;
    parts for receiving a request to initiate a logical connection between the wireless local network and the terminal station;
    parts for transmitting at least one of a type and an identity number Of the wireless local network to the terminal station, the transmission occurring following successful detection of local network activity indicating an established connection between the terminal station and the wireless local network;
    parts for, in response to the request, initiating the logical connection between the wireless local network and the terminal station;
    parts for communicating a status notification to a universal chip card installed in the terminal station, the status notification indicating that the logical connection between the wireless local network and the terminal station has been initiated;
  the universal chip card installed in the terminal station configured to poll the terminal station for specific subscriber data of the wireless local network for the logical connection in response to receiving the status notification from the terminal, station indicating that the logical connection between the wireless local network and the terminal station has been initiated.

9. A data system for connecting a wireless local network to a UMTS terminal station as claimed in claim 8, wherein the terminal station polls a temporary status of at least one of the wireless local network and the specific subscriber data of the wireless local network at periodic intervals.

10. A data system for connecting a wireless local network to a UMTS terminal station as claimed in claim 8, wherein the specific subscriber data includes a type/identity number, a subscriber identification, a password, a secret key for data encryption and decryption, and an address of an access node.

11. A data system for connecting a wireless local network to a UMTS terminal station as claimed in claim 8, wherein the terminal station further comprises the universal chip card which initiates the monitoring of the activity of the wireless local network and the transmission of data to the terminal station.

12. A data system for connecting a wireless local network to a UMTS terminal station as claimed in claim 11, wherein the terminal station notifies the universal chip card of a deactivation of the wireless local network.

13. A data system for connecting a wireless local network to a UMTS terminal station as claimed in claim 12, wherein the universal chip card initiates a cleardown of the logical connection between the wireless local network and the terminal station.

14. A data system for connecting a wireless local network to a UMTS terminal station as claimed in claim 8, wherein the terminal station acknowledges all data transmitted.

15. A UMTS terminal station having USIM/USAT functionality for establishing a connection to a wireless local network, comprising:
  parts for monitoring activity of the wireless local network, the activity based on establishing a connection between the terminal station and the wireless local network;
  parts for receiving a request to initiate a logical connection between the wireless local network and the terminal station;
  parts for initiating transmission of at least one of a type and an identity number of the wireless local network to the terminal station, the transmission occurring following successful detection of local network activity indicating an established connection between the terminal station and the wireless local network;
  parts for, in response to the request, initiating the logical connection between the wireless local network and the terminal station;
  parts for communicating a status notification to a universal chip card installed in the terminal station, the status notification indicating that the logical connection between the wireless local network and the terminal station has been initiated;
  the universal chip card installed in the terminal station configured to poll the terminal station for specific subscriber data of the wireless local network for the logical connection in response to receiving the status notification from the terminal station indicating that the logical connection between the wireless local network and the terminal station has been initiated.

* * * * *